May 19, 1959 W. L. WELLS 2,886,953
APPARATUS FOR DRIVING PIPE AND THE LIKE
Filed April 21, 1955 3 Sheets-Sheet 1
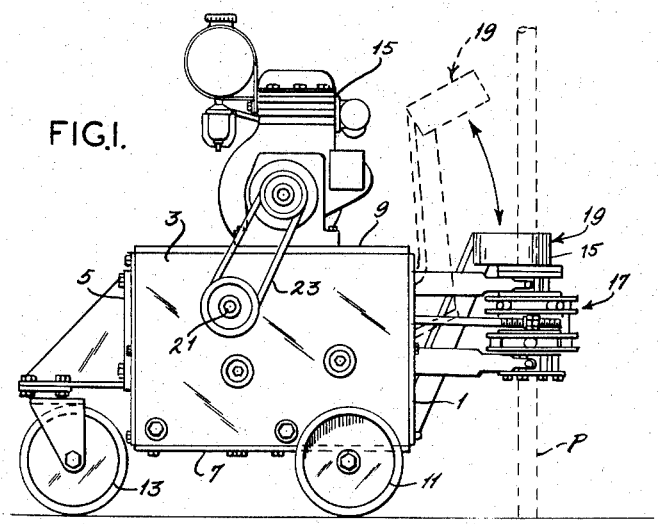
FIG.1.
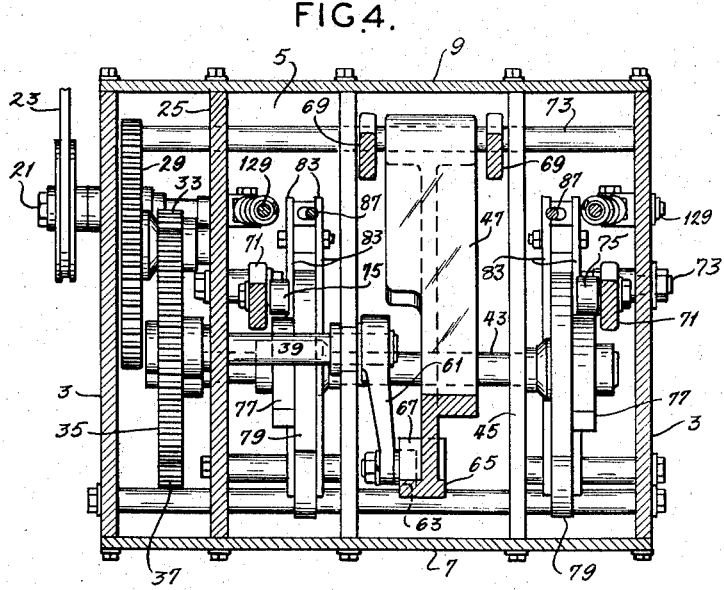
FIG.4.
FIG.7.
INVENTOR:
WILLIS L. WELLS.
Bruninga and Sutherland,
ATTORNEYS.

May 19, 1959  W. L. WELLS  2,886,953
APPARATUS FOR DRIVING PIPE AND THE LIKE
Filed April 21, 1955  3 Sheets-Sheet 3
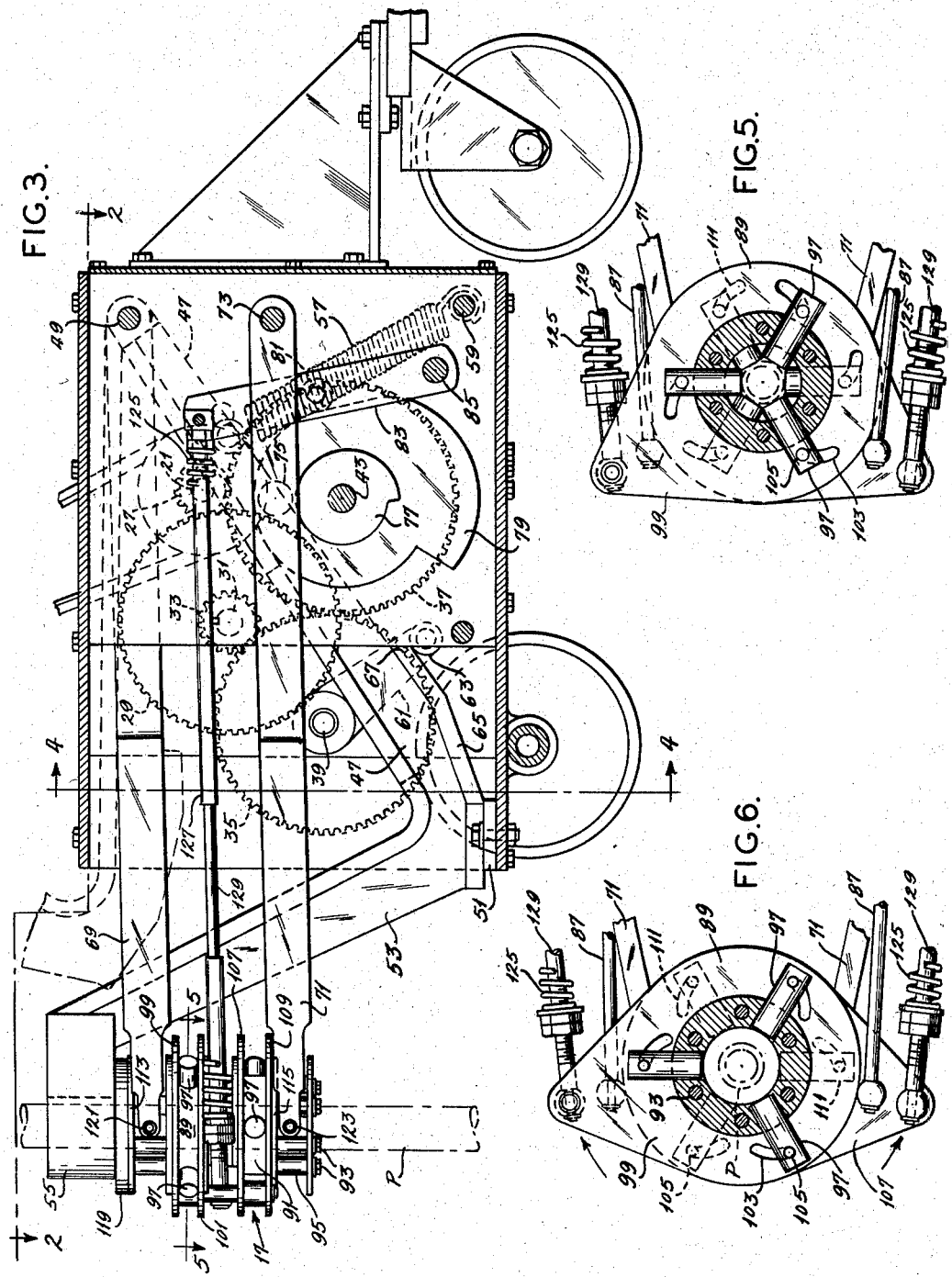
INVENTOR:
WILLIS L. WELLS.
By Bruninga and Sutherland,
ATTORNEYS.

United States Patent Office 2,886,953
Patented May 19, 1959

2,886,953

APPARATUS FOR DRIVING PIPE AND THE LIKE

Willis L. Wells, Clayton, Mo., assignor to Lambert Engineering Company, St. Louis, Mo., a corporation of Missouri Application April 21, 1955, Serial No. 502,888

10 Claims. (Cl. 61—75)

This invention relates to apparatus for driving well points and the like.

In some regions of the country, a well is made by driving pointed perforated pipe into the earth. Customarily, this is a manual operation, and for that reason, relatively short sections of pipe are required. In other words, a first section of a length convenient to hammer is driven down to the level of the earth before a second section is added. The task is an arduous one, however, and the labor is not always available, except at high cost. Accordingly, it is an object of the invention to provide a machine for driving a well point quickly and economically. Among the more specific objects of the invention may be noted the provision of a machine for driving relatively long lengths of pipe; and the provision of a machine that operates automatically and is of rugged, compact construction.

Briefly, the machine comprises a clamp for gripping the pipe and a cooperating hammer, which is raised and dropped upon the clamp to drive the pipe into the earth. As the pipe is driven downwardly, it is necessary to reposition the clamp. This is accomplished automatically by means of a clamp-opening and clamp-lifting mechanism operating in timed relationship with the movement of the hammer. As the hammer is raised, the clamp is opened, then elevated and finally reclosed upon the pipe. With the clamp in gripping engagement with the pipe, the clamp lifting mechanism is freed prior to release of the hammer so as to permit downward movement of the clamp under the blow of the hammer.

More particularly, a clamp is supported upon an arm, which is movable vertically with respect to the pipe. In addition, the clamp is provided with jaws that are movable into and out of gripping engagement with the pipe. In one embodiment of the invention, the clamp contains radially-movable jaws, and a jaw-operating device is rotatably mounted on the clamp. The hammer is elevated and dropped by means of a first cam, the jaw-operating device is actuated by means of a second cam, and a third cam is provided to elevate and release the clamp arm. The several cams are then geared together so as to operate in proper sequence.

Other features of the invention will be in part apparent from and in part pointed out in the following detail description taken in connection with the accompanying drawings, in which:

Fig. 1 is a side elevation of a machine embodying features of this invention;

Fig. 3 is a section taken on the line 3—3 of Fig. 2;

Fig. 4 is a sectional view taken on the line 4—4 of Fig. 3;

Fig. 5 is a detailed sectional view of the clamp taken on the line 5—5 of Fig. 3, with the clamp closed;

Fig. 6 is a view similar to that of Fig. 5, but showing the clamp opened; and

Fig. 7 is a section taken on the line 7—7 of Fig. 2.

Figure 2:
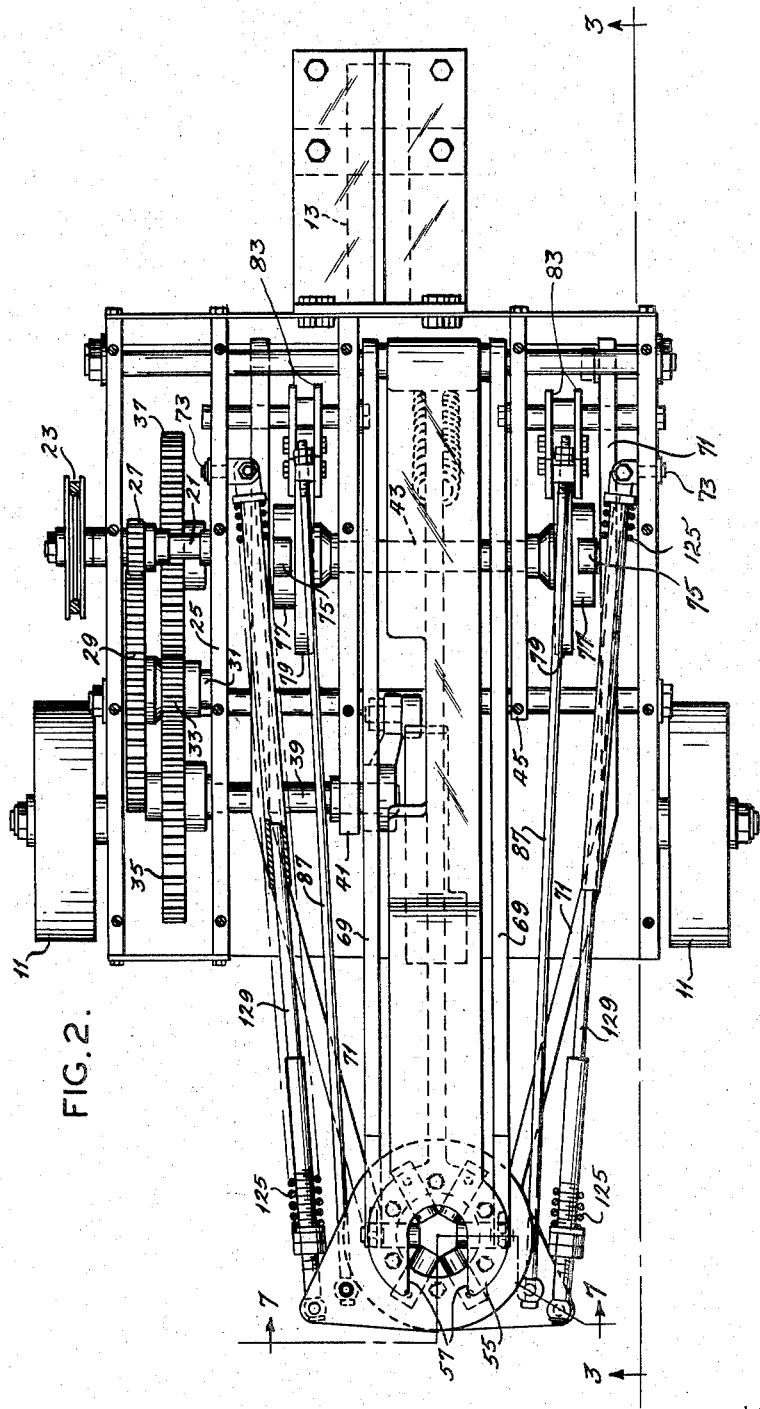
Fig. 2 is a horizontal section taken on the line 2—2 of Fig. 3.

Referring now to the drawings, there is shown a machine having a front 1, sides 3, a back 5, a base 7 and a top 9. Wheels 11 may be mounted at opposite sides of the machine near the front; and a wheel 13 may be provided at the rear, so that the machine may be readily moved to the location at which a well point is to be driven. A small internal combustion engine 15 is provided to supply the power for driving the point into the earth. Basically, the machine comprises a pipe clamp generally designated 17, a hammer 19 cooperable with the clamp, and mechanism driven by the engine for operating the hammer and clamp. The hammer is repeatedly raised and dropped upon the clamp, whereas the clamp is itself opened, elevated, reclosed, and freed for vertical movement between blows.

More specifically, there is a drive shaft 21 driven by the engine 15 from a belt 23. The drive shaft extends through one side 3 of the machine to a vertical support 25 (Figs. 2 and 4). The inner end of shaft 21 is journaled in the support 25 and carries a pinion 27. The pinion is in mesh with a large reduction gear 29 on a stub shaft 31, the latter also being journaled in the side 3 and support 25. A second pinion 33, which is keyed to the stub shaft 31, is in mesh with a second large reduction gear 35, and the gear 35 engages a third gear 37 of similar size.

As shown in Figs. 2 and 4, the gear 35 is keyed to the outer end of a hammer-operating shaft 39 extending across the front of the machine between the support 25 and a central support 41. The other gear 37 is shown in Fig. 4 to be keyed to a clamp-operating shaft 43, which extends across the rear portion of the machine from the support 25 through the central support 41 to a support 45 adjacent the other side of the machine.

The hammer 19 includes a lift arm 47 pivotally mounted on a support 49 adjacent the upper back portion of the machine (Fig. 3). This arm 47 normally extends forwardly and downwardly between the supports 41 and 45 to a cushion block 51 at the lower front portion of the machine. The cushion block serves to support the hammer when not in use and to limit the downward travel during operation. Otherwise, the hammer arm extends upwardly and forwardly at 53 toward the pipe clamp 17 and carries a bifurcated head 55. The opening 57 in the head accommodates the pipe P, which is to be driven into the ground.

The hammer is biased to its lower position of Fig. 1 by gravity and by means of a spring 57 extending from the arm 47 to a fixed spring support 59. During operation of the machine, the hammer is repeatedly raised and dropped upon the clamp by means of a crank 61 secured upon the hammer-operating shaft 39. This crank carries a roller 63 for cooperation with a lip portion 65 of the hammer arm 47. The crank is rotated clockwise (Fig. 3) and the lip 65 extends rearwardly from the hammer-supporting cushion only partially along the arm 47. When the hammer is in the lower position, the roller 65 passes the hammer arm 47 rearwardly of the end 67 of the lip and engages the lower surface of the lip at what might be termed the "5 o'clock" position. The hammer arm 47 is then elevated as the crank moves to what might be termed the "12 o'clock" position, whereupon the roller 63 moves from beneath the lip 65 beyond the end 67 thereof. Thereupon, the hammer is released and the head 55 is free to move downwardly under bias until it strikes the clamp 17.

The clamp is secured tightly to the pipe P when struck by the hammer head 55, but the clamp is openable so that it may be repositioned with respect to the pipe between blows. Such readjustment of the clamp is carried out automatically during rotation of the clamp-operating shaft 43.

The clamp 17 is supported upon upper arms 69 and lower arms 71, the former being pivotally connected to the hammer supporting rod 49. The lower arms in part diverge rearwardly and are pivotally supported at 73 from the support 25 and opposite side wall 3 (Fig. 4). As shown in Fig. 3, the pivotal supports 73 are also near the back of the machine, so that the arms 71 extend forwardly over the clamp-operating shaft 43. Rollers 75 are mounted on arms 71 at points forward of their pivotal supports, and these rollers cooperate with lifting cams 77 affixed to the clamp-operating shaft 43. As the shaft 43 rotates (in a direction counterclockwise as viewed in Fig. 3), the cams 77 are effective over one-quarter of the revolution to lift the arms 71 and thereby the clamp 17. Prior to such elevation, however, the clamp is opened. Also, the clamp-lifting cams 77 disengage from rollers 75 (to permit downward movement of the arms under the blow of the hammer), but the clamp is reclosed prior to disengagement of the lifting cams.

These steps are effected by means of jaw-opening cams 79, which are keyed to the shaft 43 adjacent the cams 77. The jaw-opening cams cooperate with rollers 81 on levers 83, the levers 83 being pivoted at 85. Otherwise, the levers 83 extend upwardly beside the jaw-opening cams 79 for connection with rods 87, which rods extend forwardly to the clamp (Fig. 2).

The clamp itself comprises an upper jaw-holding element 89 and a lower jaw-holding element 91. These elements or rings are supported on bolts 93 and are spaced from one another by means of sleeves 95. Dogs 97 are mounted in the rings for radial movement into and out of gripping engagement with the pipe P; whereas actuating plates are provided upon opposed sides of the rings in order to control movement of the dogs. The upper ring 89 has an upper plate 99 and a lower plate 101, each of which is formed with eccentric slots 103, and the interposed dogs 97 have pins 105 engaged within these slots. The slots are arranged so as to move the dogs outwardly upon rotation of the plates 99 and 101 in a clockwise direction as viewed at Figs. 5 and 6. The lower ring 91 has similar plates 107 and 109, but their slots 111 are arranged to move the interposed dogs inwardly when the plates are rotated in the counterclockwise direction as viewed in Figs. 5 and 6.

Otherwise, the clamp comprises a top plate 113 spaced over the upper ring 89 and a bottom plate 115 spaced beneath the lower ring 91. The bolts 93 extend the entire height of the clamp, the plates 113 and 115 being supported upon spacer sleeves 117. Also, the upper portions of the bolts are recessed within an annular cap 119, so as to be protected from the hammer head 55.

The clamp-supporting arms are pivotally connected to the clamp at the sides thereof, the upper arms 69 being pinned at 121 beneath the top plate 113 and the lower arms 71 being pinned at 123 above the lower plate 115. These connections prevent rotation of the clamp although dog-operating plates 99, 101, 107 and 109 are rotatable within limits. The plate 101 projects to one side of the clamp and is connected by a universal joint to one of two jaw-opening rods 87. The other plate 107 projects to the other side of the clamp and is there connected to the other jaw-opening rod 87. The arrangement is such that retraction of the rods 87 results in outward movement of the dogs, thereby opening the clamp. The dogs are driven into gripping engagement with the pipe upon advance of the rods 87 by springs 125. The springs 125 are coiled on telescoping sleeves 127 and rods 129, provided at each side of the clamp to bias the plates 99, 101, 107 and 109 towards jaw-closing positions. The bias is sufficient to secure the clamp tightly on the pipe P when the jaw-operating plates are free to move in that direction.

In operation, the crank 61 lifts the hammer, and shortly after the hammer leaves its support 51, the jaw-opening cams 79 retract the associated rods 87. The jaw-opening plates are thereby rotated and retract the dogs clear of the pipe. Thereafter, the clamp-supporting arms 71 are elevated by the lifting cams 77. As the arms reach their upper positions of movement, the jaw-opening rods 87 are released, and dogs are closed upon the pipe by springs 125. The lifting cams 77 then disengage from the arms 71, and thereafter the crank 61 moves clear of the hammer arm. When the hammer falls upon the clamp, the clamp and pipe are driven downward, whereupon the cycle is repeated.

From the foregoing description, those skilled in the art will understand the structure, function and mode of operation, and will appreciate the advantages thereof. Although one embodiment has been disclosed in detail, it is to be understood that the invention is not limited thereto, but the drawings and description are to be understood as being merely illustrative. For example, the clamp may have pivoted jaws, as in pliers, or the clamp may have wedges driven tangentially towards and away from the pipe. It is realized that many modifications and variations will present themselves to those skilled in the art without departing from the spirit of this invention or the scope thereof as set forth in the appended claims.

Having thus described the invention, what is claimed and desired to be secured by Letters Patent is:

1. In pipe-driving apparatus of the type disclosed, a portable frame, a pipe clamp mounted on the frame for vertical movement along a section of pipe held vertically, said clamp having jaws mounted for movement into and out of gripping engagement with the pipe, a hammer mounted on the frame for vertical movement from a position against said clamp to a position spaced over said clamp, and power operating means comprising a hammer-lifting and dropping cam and a clamp-lifting and releasing cam means driven by said clamp-lifting and releasing cam in timed relationship with said hammer-lifting cam to lift and release the clamp relative to the pipe during the lifting cycle of the hammer-lifting and dropping cam.

2. Apparatus as set forth in claim 1, wherein said hammer-lifting cam and said clamp-lifting cam are inter-connected by gears.

3. Apparatus as set forth in claim 1, further including a clamp-opening cam driven in timed relationship with said clamp-lifting cam to open the jaws during the lifting cycle of said clamp-lifting and releasing cam.

4. Apparatus as set forth in claim 3, wherein said clamp-opening cam and said clamp-lifting cam are inter-connected by gears.

5. In pipe-driving apparatus of the type disclosed, a portable frame, a clamp-supporting arm mounted on the frame for vertical movement, a clamp carried on said arm, a hammer-supporting arm mounted on the frame for movement in a vertical direction, a hammer head carried on said hammer-supporting arm over said clamp, a hammer-operating cam cooperating with said hammer-supporting arm to lift and drop the hammer head, and a clamp-operating cam cooperating with said clamp-supporting arm, said clamp-operating cam being driven in timed relationship with said hammer-operating cam and means operated by said clamp-operating cam to lift and release the clamp-supporting arm while the hammer-supporting arm is lifted by its cam.

6. Apparatus as set forth in claim 5, wherein said clamp further includes jaws movable into and out of gripping engagement with a section of pipe held therein, a clamp-opening arm coupled to said jaws, and a clamp-opening cam intermittently actuating said clamp-opening arm to open the jaws prior to actuation of said clamp-supporting arm and to close said jaws prior to release of said clamp-supporting arm.

7. In pipe-driving apparatus of the character disclosed, a pipe clamp having jaws mounted for movement into and out of gripping engagement with a length of vertical pipe, a hammer mounted over said clamp for generally vertical movement into and away from engagement with said clamp, power means connected to reciprocate said hammer toward and away from said clamp, clamp-actuating means, and means interconnecting said hammer-reciprocating means and said clamp-actuating means to actuate the clamp in timed relationship with strokes of the hammer.

8. In pipe-driving apparatus of the type disclosed, a pipe clamp having jaws mounted for movement into and out of gripping engagement with a length of vertical pipe, said clamp also being mounted for limited vertical movement, a hammer mounted over said clamp for generally vertical movement into and away from engagement with said clamp, power means coupled to reciprocate said hammer toward and away from said clamp, jaw-opening means for opening and closing the jaws of the clamp relative to the pipe, and means interconnecting said hammer-reciprocating means and said jaw-opening means to operate the latter in timed relationship with the former, said interconnecting means being coordinated to open and reclose the jaws of the clamp during movement of the hammer away from the clamp.

9. Pipe-driving apparatus as set forth in claim 8, further including intermittently-operating clamp-lifting means for lifting and releasing the clamp, and second means interconnecting said jaw-opening means and said clamp-lifting means to operate the latter in timed relationship with the former and lift the clamp after the jaws open and to release the clamp for downward movement after the jaws reclose.

10. In pipe-driving apparatus of the type disclosed, a pipe clamp having jaws mounted for movement into and out of gripping engagement with a length of vertical pipe, a hammer mounted over said clamp for generally vertical movement into and away from engagement with said clamp, power means connected to reciprocate said hammer toward and away from said clamp, intermittently-operating clamp-lifting means coupled to lift said clamp and then release it for downward movement, and means interconnecting said hammer-reciprocating means and said clamp-lifting means to lift the clamp during movement of the hammer away from the clamp.

References Cited in the file of this patent
UNITED STATES PATENTS

| | | |
|---|---|---|
| 2,435,651 | Huber | Feb. 10, 1948 |
| 2,655,006 | Hoen et al. | Oct. 13, 1953 |

FOREIGN PATENTS

| | | |
|---|---|---|
| 56,948 | Norway | Aug. 10, 1936 |